Dec. 17, 1963  W. C. BROWN  3,114,517
MICROWAVE OPERATED SPACE VEHICLES
Filed May 12, 1959  2 Sheets-Sheet 1

INVENTOR
WILLIAM C. BROWN
BY H. Vincent Harsha
ATTORNEY

Dec. 17, 1963

W. C. BROWN 3,114,517

MICROWAVE OPERATED SPACE VEHICLES

Filed May 12, 1959

INVENTOR
WILLIAM C. BROWN
BY H. Vincent Harsha
ATTORNEY

3,114,517
MICROWAVE OPERATED SPACE VEHICLES
William C. Brown, Weston, Mass., assignor to Raytheon Company, Lexington, Mass., a corporation of Delaware
Filed May 12, 1959, Ser. No. 812,710
11 Claims. (Cl. 244—1)

This invention pertains generally to space vehicles and the like, and more particularly to a novel form of space vehicle and a system for maintaining such vehicle in flight or at a desired location in spaced-apart relationship with respect to a mother planet or the like.

The prior art affords many examples of apparatus adapted to be propelled in spaced-apart relationship with the earth, as well as systems for maintaining this relationship in opposition to the gravitational field thereof. Exemplary devices of this type are conventional aircraft (both jet and propeller driven) and the more modern un-manned or pilotless vehicles such as rocket-propelled missiles. However, the operation of each of these vehicles of the prior art necessitates the expenditure of a fuel carried by the vehicle. Further, while an orbital Earth satellite requires no applied energy in executing a given orbit, enormous quantities of fuel are consumed in launching the satellite into orbit. Also, where the satellite vehicle is designed for the subsequent correction of or other change in the orbital path, a fuel supply must be carried by the satellite in order to provide the desired corrective thrusts.

It is thus apparent that in each of these prior art vehicles a fuel supply must be carried thereby for local consumption in order to initiate, maintain or alter a given flight pattern, whether such pattern involves motion of the vehicle relative to the Earth or a substantially motionless hovering with respect thereto. It therefore follows that the maximum payload capabilities of such vehicles are limited by the fact that the vehicle must support the weight of the fuel carried thereby. Also, such vehicles are not naturally adapted to indefinitely long periods of continuous operation, since the fuel supply therein will eventually be exhausted, necessitating a return of the vehicle to a refueling base, or alternatively, an in-flight refueling process as is accomplished with some conventional aircraft.

The utility of a space vehicle or the like which is capable of sustained flight over an indefinitely long period of time without employing a local fuel supply is evident, and the applications therefor are numerous. For example, a vehicle capable of perpetual operation (except for mechanical failure) and stationed in space above the surface of the Earth, either within or without the atmosphere thereof, may perform alarm and surveillance tasks by radar techniques, along with guidance and protection of defense vehicles, and may simultaneously provide long-haul broadband communications. Systems of such vehicles or platforms may be established to provide radar and communication networks.

These desired operational characteristics are provided by the vehicle of the present invention, which vehicle is energized by means of transmitted microwave electromagnetic energy that is beamed toward the vehicle. The microwave energy incident upon the vehicle is converted into appropriate mechanical forces which produce the desired flight operation of the vehicle. The advantages attendant the utilization of microwave energy, in contrast to electromagnetic energy of other wavelengths, are readily apparent. Microwaves have been generally defined as radio waves whose wavelength is less than 30 centimeters, with a lower wavelength limit on the order of one millimeter or one centimeter sometimes being applied to what is called "the microwave region." The superiority of microwaves is due in part to the fact that it is generally necessary to focus the transmitted energy so as to achieve a desirably high power density at a remote point or area with respect to a given generator or transmitter power level. In accordance with the laws of optics, the sharpness of the beam produced by an antenna varies as the ratio of antenna dimensions to the wavelength of the transmitted energy. Thus, for a given or desired power density or beam sharpness, a decrease in the wavelength of the transmitted energy permits a corresponding decrease in the dimensions of the antenna. From the standpoint of mechanical convenience, it is generally desirable to employ small antennas and other components, and it is therefore advantageous to employ energy of very short wavelength. In addition, the difficulties encountered in relatively long wave transmission as a result of natural and man-made interference or noise (which noise would interfere with the transmission of radar or communications intelligence via the microwave power beam) do not occur with any appreciable significance at microwave frequencies. Also, where the space vehicle is to be operated at an altitude above the ionosphere, long wave transmission will generally be reflected by the reflecting layers thereof, while microwaves pass through such layers substantially unaffected.

In view of the several advantages stated above, it might appear desirable to employ the shortest wavelength possible commensurate with the power-generating capabilities of the transmitter at the wavelength chosen. A lower limit is fixed, however, for the wavelength that may be used in a practical radiating system in view of the increasing losses due to absorption occurring in the atmosphere at wavelengths below five to ten centimeters. In the one to two centimeter region, there is a peak in absorption by water vapor, and even for dry air the absorption of electromagnetic energy increases very rapidly below one or two centimeters. It may thus be seen that microwaves in a region having the approximate bounds of two and thirty centimeters are readily adaptable to convenient radiation of energy to a remote point with small transmission loss, with the preferred wavelengths being of the order of five or ten centimeters in order to accomplish efficient focusing with a transmitting lens system of reasonable size without inflicting an intolerable power loss by absorption.

The key to the practical utilization of high-power electromagnetic beams for remote energization of space vehicles and the like is a device which will generate large amounts of power within this wavelength region. In addition, many applications of such high-power beams require such refinements as broad electronic bandwidth and low phase distortion, placing the additional requirement of sophisticated performance on the high-power generator. A device which currently satisfies the duel requirements of high power output and refined performance is the Amplitron tube, a relatively new type of crossed-field vacuum tube which may be used as a compact, highly efficient, broadband amplifier capable of handling high peak and average powers, and which generally comprises a circular but non-reentrant, dispersive network matched at both ends over the frequency region of interest, and a reentrant electron beam originating from a continuously-coated (or nearly so) cathode coaxial with the network, with a D.-C. potential being applied between the cathode and anode, and a magnetic field applied parallel to the axis of the cathode and transverse to the electric field between the anode and the cathode. For a more complete description of the Amplitron, reference may be had to my application Serial No. 706,812, filed January 2, 1958, for "Low Level Duplexer System," now United States Letters Patent No. 2,933,723, which issued April 19, 1960. Amplitrons currently available are capable of producing 15 or 20 kilowatts of average radio-frequency power in the neighborhood of ten centimeters in wavelength, and future models are expected to yield 500 kilowatts or more average power, with 50 megawatt peak power.

It is accordingly a primary object of this invention to provide a space vehicle or the like designed for an indefinitely long period of operation either in moving flight or at a selectable location with respect to the Earth or other mother planet, with energy necessary for such operation being supplied to such device in the form of microwave electormagnetic energy.

A further object of the invention is to provide a system for maintaining a space vehicle either in moving flight or at a selectable location with respect to a mother planet or the like in response to microwave electromagnetic energy transmitted from such mother planet to the vehicle.

In accordance with an exemplary embodiment of the present invention, this system for maintaining flight of the space vehicle includes means on the Earth or some other mother planet for radiating microwave energy in a beam directed toward and focused on the vehicle for substantially continuously supplying such vehicle with the power necessary for the operation thereof. The space vehicle of the invention has means associated therewith for receiving and converting incident microwave energy into appropriate forces applied to the vehicle to sustain flight. The received microwave energy may be directly converted into a flight-producing force as by an ion engine or the like, or the microwave energy may be subjected to a mesne conversion to heat. In the latter case, means are provided for applying the heat converted to a suitable fluid medium which is expanded thereby to perform the work necessary to propel or sustain the vehicle.

In one preferred form of the apparatus of the invention, a plurality of thrust-providing engines are mounted for rotary movement about a substantially vertical common axis along which the beam of energy is normally transmitted, with suitable airfoil means being mounted for movement with such engines to provide the lifting force necessary to maintain flight of such vehicle. Means are provided for apportioning the received energy between the several engines in such manner as to selectively energize the engines to maintain the vehicle centered on the transmitted beam.

In an alternative form of the apparatus of this invention, a plurality of thrust-providing engines are symmetrically positioned with respect to the vertical central axis of the vehicle along which the beam of energy is normally transmitted. Means are provided for distributing the received energy between the engines so as to differentially energize the engines to apply corrective forces to the vehicle upon the occurrence of angular or translational displacement of the axis thereof from the center line of the radiated beam.

With the above considerations and objects in mind, the invention itself will now be described in connection with a preferred embodiment thereof given by way of example and not of limitation, and with reference to the accompanying drawings, in which.

Figure 1:
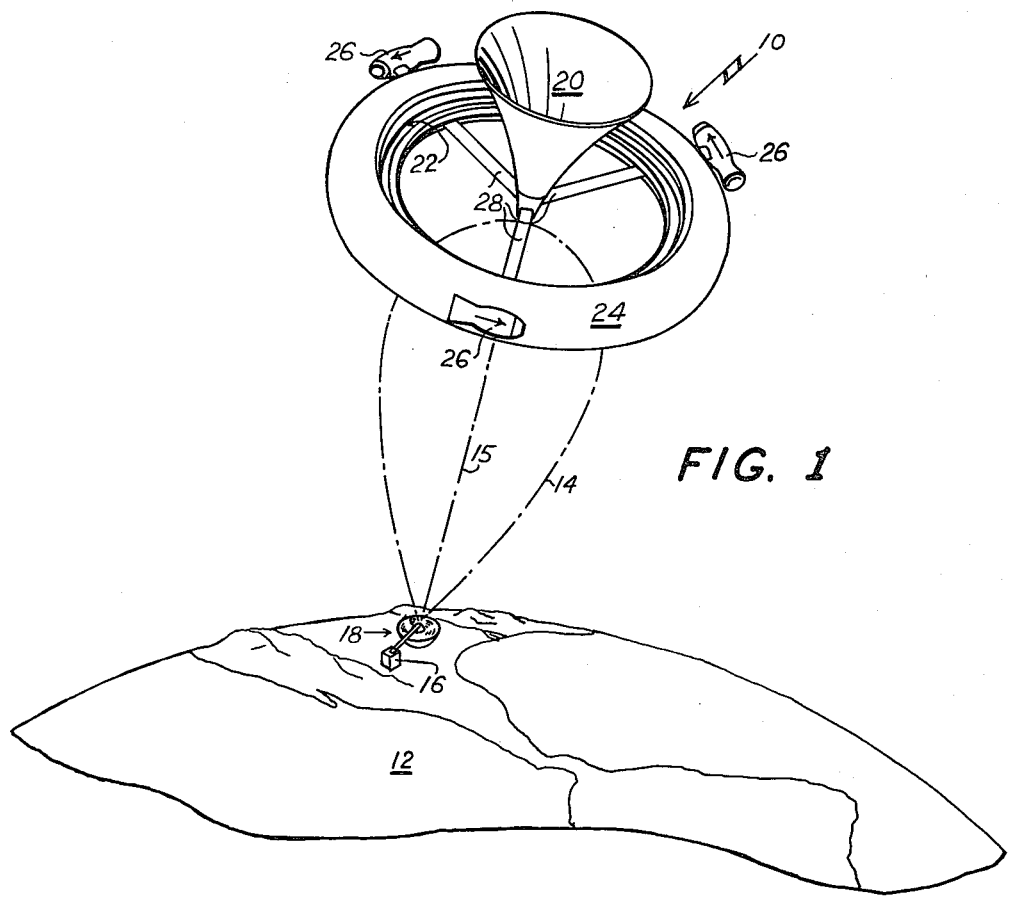
FIG. 1 is a perspective view of a preferred form of the apparatus of the present invention, schematically indicating the control system therefor.

Referring now to FIG. 1, one preferred form of the vehicle of the present invention is indicated generally at 10. As shown, the vehicle 10 is adapted to be maintained in flight or in hovering position with respect to the Earth or other mother planet 12 by means of energy transmitted to the vehicle as radiated microwave electromagnetic energy in beam form, as indicated by lobe 14 having center line 15. A suitable transmitter 16 is provided for this purpose, along with a beam-forming transmitting antenna 18. As will be appreciated by those skilled in the art, the representations of the transmitting equipment and microwave beam in FIG. 1 are highly diagrammatic in form, and the present invention is not limited to any particular transmitter or antenna assembly. As a practical matter, however, the reflector of the antenna assembly 18 is considerably larger than most of the reflectors of the prior art in order to focus a large amount of power at a high-altitude (e.g. 65,000 feet) space vehicle. In an exemplary embodiment, the antenna reflector is at least partially supported in a large bowl or other dug-out area on the Earth's surface so as to provide a convenient means of support therefor. Also, the antenna may actually comprise a large number of small horn and reflector assemblies. In addition, the transmitter 16 is capable of much greater power output than most of the prior art transmitters, and, as stated in the earlier paragraphs of this specification, the power-generating element of the transmitter is preferably an Amplitron tube in order to achieve sufficient power output.

The microwave energy that illuminates the vehicle 10 is intercepted by the under or concave side of the reflecting member 20, the curvature of which is such that the energy received along a substantially straight line parallel to the central axis of the radiated beam of energy is reflected into an annular opening 22 in the frame member 24. The latter frame member may preferably comprise a hollow waveguide for the received radio-frequency energy, and the energy applied thereto through the opening 22 is, in turn, applied to the several engines 26 connected thereto.

The means for maintaining flight or hovering conditions in the vehicle 10 include the several engines 26, which effect a rotary motion of the vehicle frame in the direction shown by the arrows about a substantially vertical central axis normally coinciding with the center line of the transmitted beam 14 of microwave energy. Upon such rotary motion of the vehicle frame, a sustaining lift is provided by means of a plurality of airfoil members 28, which may generally be in the form of the rotary wings of a helicopter or the like. It will be understood that only the basic elements of the vehicle 10 are shown in the drawing, and that other frame members and the like would normally be provided to support a payload of radar, communication or other similar equipment. In this connection, the beam 14 also provides a signal-information link between the ground station and the payload equipment on the vehicle.

Figure 2:
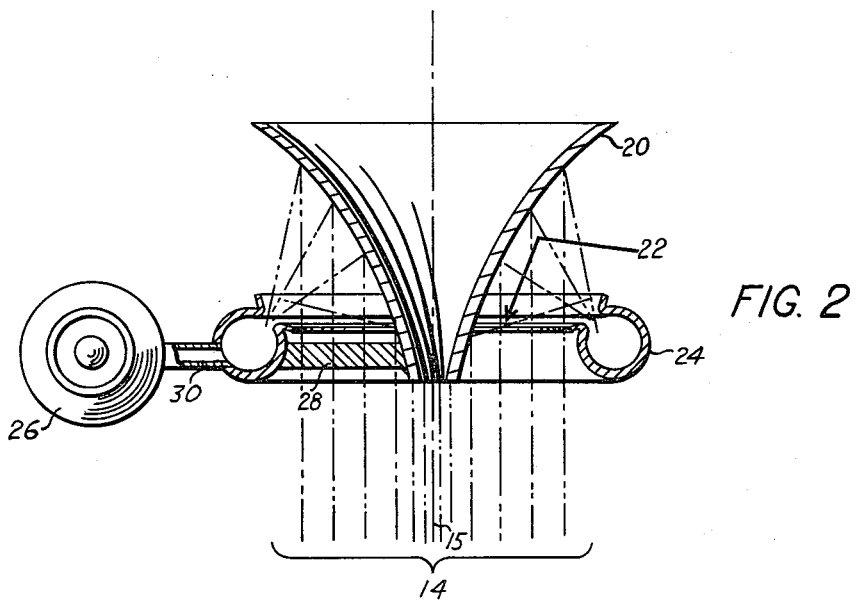
FIG. 2 is a partial sectional view in elevation of the vehicle shown in FIG. 1, the section being taken substantially centrally of the vehicle.

FIG. 2 shows in somewhat greater detail the construction of the apparatus of FIG. 1, with the showing of FIG. 2 being taken along a vertical plane through one of the supporting airfoil members 28. The construction and operation of the several thrust engines will not be discussed in detail herein, since a complete description of engines suitable for this purpose is provided in my application Serial Number 812,697, filed May 12, 1959, now United States Letters Patent No. 3,083,528, which issued April 2, 1963, and assigned to the assignee of the present application. As disclosed in such application, an exemplary embodiment of an engine suitable for use in the vehicle of the present application includes a heat-exchanging container means adapted to be energized by microwave energy to heat a gaseous medium therein and cause expansion of same to produce a jet stream for providing a propulsive thrust. In one preferred form of the invention, the container means comprises an electromagnetic waveguide of lossy characteristics which produces heat upon energization by suitable electromagnetic energy to raise the temperature of a gaseous medium passing therethrough. A member of stacked and closely-spaced electrically lossy plates is preferably mounted within the waveguide to serve as the main means for absorbing microwave energy and converting same into heat, as described in detail in the aforementioned copending application. The plurality of closely spaced plates form therebetween a series of narrow passages through which passes the gaseous medium which is to be heated thereby. The microwave energy employed is of sufficiently high frequency to produce a pronounced skin effect in the waveguide and associated heat-exchanger, so that the energy expended in creating heat in the steady state condition is effectively and quickly transferred to the gaseous medium in which the particular conductor exhibiting the skin effect is immersed. This latter feature is particularly advantageous in transient-state conditions with respect to the ability of the engine of this invention to provide almost instantaneous response to a change in the level of the applied microwave energy, since little or no time lag is involved in converting electromagnetic energy to heat and transferring it to the cooling gas. As is evident, the heated gas may be formed into a jet stream in order to provide propulsion, or a turbine may be driven thereby to provide a rotary shaft output for driving a propeller or the like.

As may be seen in FIG. 2, the engines 26 are supported from the rotary frame member 24 by means of suitable supporting members 30 which also serve as the means for transferring the microwave energy in the interior of the frame member 24 to the interior of the engines 26. Thus, each of the supporting members 30 must be adapted to act as a transmission line of short length for the radio-frequency energy employed. The particular curvature of the reflecting member 20 is chosen so as to effect the reflection of radiated energy indicated in FIG. 2, viz., the energy transmitted toward the vehicle reaches the reflector member 20 along substantially straight parallel paths as shown by the vertical dash-dot lines, and upon reflection all of the received energy is focused on the opening 22 in the frame member 24 so that it may be transferred into the several engines 26.

Figure 3:
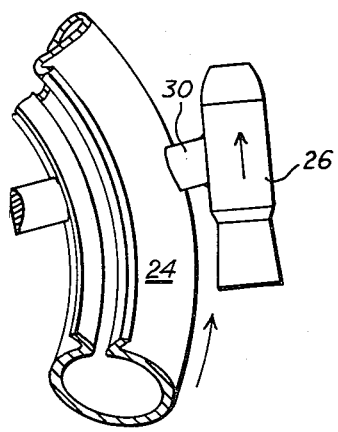
FIG. 3 is a plan view of a portion of the apparatus of FIG. 1.

FIG. 3 shows that the direction of thrust produced by each of the engines 26 is not quite tangential to the circle of rotation thereof. As shown, the engines 26 are mounted at a small angle with respect to the periphery of the frame member 24, so that while the major portion of the thrust produced by each of the engines is tangential to such periphery, a small component thereof is directed away from the center of the vehicle. This construction is employed in order to provide a vehicle which is capable of a self-centering or beam riding operation, as will be more fully described below.

In the operation of the device thus far described, transmitter 16 generates a suitable microwave signal for transmission to the vehicle 10 by means of the radiating antenna 18. In the normal operation of the device, the reflecting member 20 will be centrally positioned in the radiated beam 14, and the energy of the beam will therefore be reflected in equal amounts toward all portions of the annular opening 22 in frame member 24. As a result, the three engines 26 will receive equal amounts of the radio-frequency energy, and normal operation is thereby effected, resulting in a rotary movement of the engines 26 and the frame member 24 about the central vertical axis of the vehicle 10. As mentioned above, such rotational movement of the frame member 24 produces a corresponding rotation of the airfoil members 28 to provide a vertical thrust for maintaining the vehicle 10 in flight or in a hovering position with respect to the mother planet 12.

In order to maintain the vehicle 10 in a desired location with respect to the center-line of the transmitted radio-frequency beam 14, viz., at a centered position with the vertical central axis of the vehicle coinciding with the center line of the transmitted beam, the shape of the concave reflecting surface of member 20 is chosen as described above to reflect energy of the beam 14 equally to the several engines 26 when the vehicle 10 is properly centered in the beam 14. Upon a lateral displacement of the vehicle 10 from the beam 14, one side of the reflecting surface 20 will be illuminated by more radiated energy than the opposite side, and the several engines 26 are thereupon differentially energized to provide corrective lateral forces to achieve recentering of the vehicle in the beam. It will be understood that the desired tolerance as to vehicle position and the lateral dimensions of the beam and the vehicle are so interrelated that a displacement beyond such tolerance will result in a significant degree of such differential energization. For example, if the vehicle 10 were to be displaced toward the right in FIG. 2, the left-hand portion of the reflecting member 20 would lie nearer the center of the beam 14, and the engine shown in FIG. 2 would thereupon receive a greater amount of energy than the other engines. Since the engine 26 of FIG. 2 (as well as each of the remaining engines of the vehicle) provides a component of thrust normal to the circle of rotation thereof and directed away from the center of the vehicle, such additional energization of the engine shown in FIG. 2 will provide a resultant lateral thrust toward the left in this figure. It is evident that the particular engine 26 shown in FIG. 2 will be in motion, and will therefore not remain at the position shown to continuously receive the major portion of the energy intercepted by reflector member 20. As each of the engines 26 passes through the azimuthal position of rotation opposite to the direction of lateral displacement of the vehicle 10 from the center of the beam 14, it then receives a greater energization than the remaining engines, and such differential energization of the several engines 26 continues with the rotational movement of such engines until the vehicle is once again centered in the beam 14. As will be appreciated by those skilled in the art, there must be a minimum lag in the transient response of each of the engines 26 in order to achieve the self-centering action. In this connection, the efficacy of the engine of my aforementioned copending application is evident. As stated above, the thermal time lag of this engine is minimal as a result of the fact that there is a significant skin effect in the microwave heat exchanger, and the transient-state heat changes are produced in intimate proximity to the fluid medium to be heated. As a result of the propinquity of the heat source (the shallow skin effect penetration of the heat-exchanging wall) and the sink (the fluid medium to be heated), such engines are able to respond almost instantaneously to a change in the power input, thus making the self-centering of vehicle 10 feasible.

Figure 4:
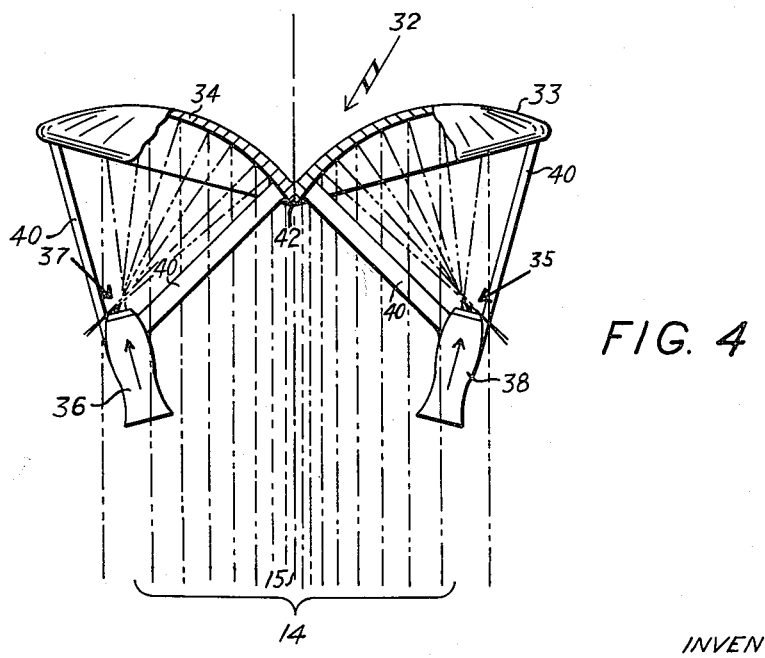
FIG. 4 is a partial sectional view in elevation of an alternative form of the apparatus of this invention.

An alternative form of the apparatus of this invention is shown in FIG. 4, with the vehicle therein being indicated generally at 32. As shown, the vehicle 32 includes reflector members 33 and 34 having concave lower surfaces for reflecting incident microwave energy of beam 14 to respective focal points indicated generally at 35 and 37. A plurality of supporting arms 40 are provided for mounting the respective engines 36 and 38 on the reflecting members 34 and 33. The diagrammatic showings of engines 36 and 38 in FIG. 4 are intended to represent jet engines of the type disclosed in my aforementioned copending application, and it is to be understood that the microwave energy necessary for operation of each engine 36 and 38 is received at the upper or intake end thereof. The focus "points" 35 and 37 are in reality areas rather than points, and the engines 36 and 38 are intentionally mounted slightly inboard of a centered position with respect to the associated area 35 or 37, so that normally not all of the energy at each area is directed into the respective engine. This condition is indicated in FIG. 4 by the several reflected dot-dash lines which pass by rather than into the mouths of engines 36 and 38. The particular proportion of energy that is thus normally wasted, as compared to that portion which is collected by the engines, is a matter of choice in design in a given instance, but it is generally desirable to utilize a major portion (e.g., 85 or 90 percent) of the available energy for normal energization of the engines. The magnitude of the portion that is normally wasted will generally be determined in accordance with the peak wind velocities occurring at the altitude at which the vehicle is to operate, as will be better understood in connection with the description of the operation of vehicle 32.

As in the case of the vehicle described in connection with the earlier figures, there will normally be other additional members employed in actual practice in order to support such operational or "pay load" equipment as radar, communications transceivers and the like. The configuration of the reflecting surface of members 33 and 34 is such as to equally divide energy of beam 14 between the engines mounted on the vehicle 32 when such vehicle is centered (both translationally and angularly) with respect to the beam 14, as shown in FIG. 4. As may be seen, the positions in which the engines 36 and 38 are mounted is such as to provide respective thrusts directed upwardly and away from the center of the vehicle 32. Thus, the thrust produced by each of the engines 36 and 38 has a major component substantially parallel to the direction of transmission of the radio-frequency energy, along with a minor component normal thereto and directed away therefrom. By means of this construction, the vehicle 32 may be maintained in flight or hovering condition and may also be controlled as to attitude in the plane of the drawing sheet. As will become apparent in connection with the description of the operation of the apparatus of FIG. 4, it will be necessary to provide three such engines to achieve attitude control in all directions.

In the operation of the vehicle of FIG. 4, when the vehicle is operating in a centered position with respect to the beam of microwave energy 14, with the central vertical axis of the vehicle in registry with the center line of the radiated beam, a propulsive thrust is provided for either propelling the vehicle upwardly or for maintaining a given altitude in opposition to gravitational forces, and the thrust components normal to the direction of the radiated beam 14 are equal in magnitude and so directed as to cancel each other.

When the vehicle 32 is moved from this desired position, as by wind forces or the like, the vehicle is re-centered on the beam by virtue of the structure described. For example, if the vehicle were to suffer translation toward the right as viewed in FIG. 4, the reflecting member 34 would lie nearer the center of the beam 14 and would therefore intercept a greater amount of radio-frequency energy that would member 33. Accordingly, engine 36 would be illuminated with more energy than falls on engine 38, and the oppositely-directed horizontal or lateral components of force exerted by the respective engines would result in a net lateral force applied to the vehicle 32 and directed toward the left in FIG. 4. This lateral correcting force will be so applied until the vehicle is once again entered on the beam. A corresponding operation obtains where the vehicle 32 is displaced laterally to the left in FIG. 4.

In addition, the structure of FIG. 4 provides automatic attitude correction to restore the vehicle to a desired position upon an unwanted angular displacement thereof with respect to the center line of the beam 14 of radiated energy. For example, if the vehicle 32 were to be angularly displaced in a clockwise direction about an axis perpendicular to the drawing sheet and passing through apex 42, the reflecting member 33 would, as a result, be moved toward a position more nearly normal to the direction of the incoming radiant energy. As a result, the angles of incidence and reflection are correspondingly increased, and the focus point 35 is moved toward the engine 38 to supply a greater level of energization thereto. A corresponding decrease in the energization of engine 36 obtains, and a net resultant force is applied to the vehicle 32 about the aforementioned axis at apex 42 to correct the attitude of the vehicle. As is evident, a similar but oppositely-directed operation occurs upon angular displacement of the vehicle 32 in a counter-clockwise direction.

The invention has been described above in considerable detail, and particularly with reference to its application to a space vehicle adapted to be maintained at a desired altitude and lateral position in spaced-apart relationship with respect to the Earth or other mother planet. However, it will be apparent to those skilled in the art that the invention is equally applicable to vehicles adapted for movement relative to such mother planet, whether involving a change in altitude, latitude or longitude, or some combination thereof, so long as a suitable beam of radiant energy is provided. The vehicle of FIG. 4 is shown and described as having a separate dished reflector for each engine. However, it is evident that a single reflecting surface of revolution may equally well be employed, along with a suitable annular collecting and distributing means, as indicated in FIGS. 1 and 2. Conversely, the separate reflectors of FIG. 4 may equally well be employed in the embodiment of FIGS. 1 and 2. Further, the embodiment of FIG. 4 is not necessarily strictly alternative to that of the preceding figures, since the two embodiments may be combined in a single vehicle to perform the combined results of each embodiment.

In addition, the invention is not limited to use of any particular form of thrust-providing engine (except as to the requirement that it be energized by received radiant energy), and the particular means for creating the propulsive thrust may be either a jet stream, a propeller or the like. In this connection, it should be noted that while the vehicle of the present invention is described as being energized solely by microwave electromagnetic energy, the vehicle may also include a conventional engine and fuel supply system for supplementing the action of the microwave engines until such fuel supply is exhausted. Also, the invention is applicable to tethered air vehicles, and where the operating altitude is low, the tethering means may serve as a transmission line for supplying energy to the vehicle without prohibitive losses. Hence the invention is not to be considered as being limited to the particular details given, nor to the specific application to which reference has been made during the description of the apparatus, except insofar as may be required by the scope of the appended claims.

What is claimed is:

1. A thrust-propelled space vehicle adapted to be maintained in a centered position with respect to a beam of radiated energy, comprising a plurality of thrust engines mounted for rotary movement about a common axis, a major portion of the thrust applied to such vehicle by each of said engines being substantially tangential to the circle of rotation thereof with a minor portion of such thrust being directed outwardly from such circle, airfoil means mounted for movement with said engines to apply a lifting force to such vehicle, means for receiving energy radiated toward such vehicle in a beam normally lying along said axis and for applying such energy to said plurality of engines to energize the latter thereby, the energy thus being applied to said engines being apportioned in accordance with the relative positions of each of said engines and the center of such beam upon a displacement of such beam away from said axis, with those engines disposed more nearly in the direction of displacement of such beam center from said axis at any given instant receiving relatively greater energization than others, whereby corrective forces are applied to such vehicle in directions substantially normal to said axis to maintain such vehicle centered on such beam.

2. A thrust-propelled space vehicle comprising a plurality of thrust engines mounted for rotation about a common axis at equal distances therefrom, a major portion of the thrust applied to such vehicle by each of said engines being substantially tangential to the circle of rotation thereof with a minor portion of such thrust being directed outwardly from such circle, airfoil means mounted for movement with said engines to provide a lift force for sustaining air flight of such vehicle, means for receiving energy radiated toward such vehicle in a beam normally lying along said axis and for applying such energy to said plurality of engines in amounts apportioned in direct relationship with the respective distances of each of said engines from the center line of such beam at any given instant, whereby said engines are energized by such received energy to provide movement of said airfoil means and to provide corrective forces to such vehicle in directions substantially normal to said axis to maintain such vehicle centered on such beam.

3. A thrust-propelled space vehicle in accordance with claim 2, with such radiated energy being microwave electromagnetic energy, said engines including means for converting incident electromagnetic energy into propulsive thrust, and said energy receiving and applying means comprising a concave surface of revolution positioned on said axis to reflect the electromagnetic energy of such beam to said engines.

4. A thrust-propelled space vehicle adapted to be maintained in a centered position with respect to a beam of radiated energy, comprising a pair of thrust engines adapted to be energized by such radiated energy and mounted in symmetrical relationship on opposite sides of a central axis of such vehicle, said pair of engines being mounted in a substantially common plane including such central axis and at angles with respect to such axis to apply to such vehicle respective thrusts having components directed away from such axis, and means symmetrically disposed about such axis for directing energy from such beam to said engines in respective amounts apportioned in accordance with the relative distances between each of said engines and the center line of such beam, whereby said engines are differentially energized to exert corrective thrusts upon displacement of such axis from the center line of such beam.

5. A thrust-propelled space vehicle in accordance with claim 4, with such radiated energy being microwave electromagnetic energy, said engines including means for converting electromagnetic energy into propulsive thrust, and said directing means comprising a pair of concave reflecting members each reflecting a portion of the energy of such beam to a respective one of said converting means.

6. A thrust-propelled space vehicle adapted to be maintained in a centered position with respect to a beam of radiated energy, comprising a plurality of thrust engines adapted to be energized by such radiated energy and mounted in symmetrical relationship with respect to a central axis of such vehicle, the thrust produced by each of said engines being substantially confined to a respective plane including such central axis and having components both parallel with and directed away from such central axis, and means symmetrically disposed about such axis for directing energy from such beam to said engines in respective amounts apportioned in accordance with the relative distances between each of said engines and the center line of such beam, whereby said engines are differentially energized to exert corrective thrusts upon displacement of such axis from the center line of such beam.

7. A system for maintaining a thrust-propelled space vehicle in spaced-apart relationship with a mother planet at a selectable location with respect thereto, comprising a control station on such mother planet for transmitting microwave electromagnetic energy in a substantially vertically-directed beam to such vehicle, a plurality of thrust engines on such vehicle mounted for rotary movement about a substantially vertical common axis, a major portion of the thrust applied to such vehicle by each of said engines being substantially tangential to the circle of rotation thereof with a minor portion of such thrust being directed outwardly from such circle, airfoil means mounted for movement with said engines to provide a lifting force for sustaining air flight of such vehicle, means for receiving energy transmitted toward such vehicle along said axis from said control station and for applying such energy to said plurality of engines to energize the latter thereby, the energy thus being applied to said engines being apportioned in accordance with the relative positions of each of said engines and the center of such beam upon a displacement of such beam away from said axis, with those engines disposed more nearly in the direction of displacement of such beam center from said axis at any given instant receiving relatively greater energization than others, whereby corrective forces are applied to such vehicle in directions substantially normal to said axis to maintain such vehicle centered on such beam.

8. A system for maintaining a thrust-propelled space vehicle in spaced-apart relationship with a mother planet at a selectable location with respect thereto, comprising a control station on such mother planet for transmitting microwave electromagnetic energy in a substantially vertically-directed beam toward such vehicle, a pair of thrust engines on such vehicle adapted to be energized by such radiated energy and mounted in symmetrical relationship on opposite sides of a central axis of such vehicle normally coinciding with the center line of such beam, said pair of engines being mounted in a substantially common plane including such central axis and at angles with respect to such axis to provide respective thrusts to such vehicle having components both normal to and parallel with such axis, and means symmetrically disposed about such axis for directing energy from such beam to said engines in respective amounts apportioned in accordance with the relative distances between each of said engines and the center line of such energy beam, whereby said engines are differentially energized to exert corrective thrusts upon displacement of such axis from the center line of such beam.

9. A system for maintaining a thrust-propelled space vehicle in spaced-apart relationship with a mother planet at a selectable location with respect thereto, comprising a control station on such mother planet for transmitting microwave electromagnetic energy in a substantially vertically-directed beam toward such vehicle, a plurality of thrust engines on such vehicle adapted to be energized by such transmitted energy and mounted in symmetrical relationship with respect to a central axis of such vehicle normally coinciding with the center line of such beam, the thrust produced by each of said engines being substantially confined to a respective plane including such central axis and having components both parallel with and directed away from such central axis, and means symmetrically disposed about such axis for directing energy from such beam to said engines in respective amounts apportioned in accordance with the relative distances between each of said engines and the center line of such energy beam, whereby said engines are differentially energized to exert corrective thrusts upon displacement of such axis from the center line of such beam.

10. A space vehicle, comprising body means, antenna means on said body means for intercepting incident microwave energy, means on said body means for converting said intercepted microwave energy directly into a flight-producing force applied to said body means, and means for directing microwave energy intercepted by said antenna means to said converting means.

11. A system for remotely energizing a space vehicle, comprising means at a control station on a mother planet for generating microwave energy, means at such control station to radiate such microwave energy to such space vehicle, antenna means on said vehicle for intercepting such radiated microwave energy, means on such vehicle for converting said intercepted microwave energy directly into a flight-producing force applied to such vehicle, and means for directing microwave energy intercepted by said antenna means to said converting means.

References Cited in the file of this patent

UNITED STATES PATENTS

| | | |
|---|---|---|
| 889,790 | Kitsee | June 2, 1908 |
| 930,508 | Vreeland | Aug. 10, 1909 |
| 2,471,744 | Hershberger | May 31, 1949 |
| 2,769,601 | Hagopian | Nov. 6, 1956 |
| 2,813,242 | Crump | Nov. 12, 1959 |
| 2,941,764 | Lee et al. | June 21, 1960 |
| 2,949,550 | Brown | Aug. 16, 1960 |

OTHER REFERENCES

"Vistas in Astronautics," published by Pergamon Press in 1958; page 192.

Advanced Propulsion Systems, published 1959 by Pergamon Press, pp. 81–88.